United States Patent [19]
Kawasaki et al.

[11] Patent Number: 5,274,416
[45] Date of Patent: Dec. 28, 1993

[54] PHOTOGRAPHING LENS

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 726,799

[22] Filed: Jul. 8, 1991

[30] Foreign Application Priority Data

Jul. 6, 1990 [JP] Japan .................. 2-178828

[51] Int. Cl.$^5$ .................. G03B 7/00
[52] U.S. Cl. .................. 354/412; 354/195.1; 354/286
[58] Field of Search .................. 354/195.1, 286, 412

[56] References Cited

U.S. PATENT DOCUMENTS

| | | | |
|---|---|---|---|
| 4,477,164 | 10/1984 | Nakai et al. | 354/286 |
| 4,509,842 | 4/1985 | Taniguchi et al. | 354/402 |
| 4,560,267 | 12/1985 | Nakai et al. | 354/412 |
| 4,602,861 | 7/1986 | Taniguchi et al. | 354/403 |
| 4,673,275 | 6/1987 | Nakai et al. | 354/412 |
| 4,841,322 | 6/1989 | Kawasaki et al. | 354/400 |
| 4,860,113 | 8/1989 | Miyamoto et al. | 354/286 |
| 4,945,376 | 7/1990 | Kawasaki et al. | 354/400 |
| 4,959,728 | 9/1990 | Takahashi et al. | 354/286 |
| 5,060,005 | 10/1991 | Itoh et al. | 354/286 |
| 5,065,175 | 11/1991 | Suzuki et al. | 354/286 |
| 5,126,780 | 6/1992 | Satou et al. | 354/286 |
| 5,157,431 | 10/1992 | Mabuchi et al. | 354/286 |

Primary Examiner—David M. Gray
Attorney, Agent, or Firm—Sandler Greenblum & Bernstein

[57] ABSTRACT

A photographing lens includes a memory which stores lens data corresponding to a plurality of photographing conditions. An input and output device transmits and receives data to and from an external device. A photographing condition detector detects the photographing conditions of the photographing lens, while a data reader reads the lens data corresponding to the photographing condition data detected by the photographing condition detector or photographing condition data inputted through the input and output device from the memory to output the read data through the input and output device.

16 Claims, 14 Drawing Sheets

PHOTOGRAPHING LENS

BACKGROUND OF THE INVENTION

1. Field of the Invention

The present invention relates to a photographing lens having a memory means in which lens data peculiar to the photographing lens is stored.

2. Description of Related Art

A photographing lens (interchangeable lens) in a recent single lens reflex camera having an automatic focusing device is usually provided with a memory (e.g., ROM) in which lens data peculiar to the photographing lens is stored. The camera body is provided with a control means which communicates with the memory to read the lens data stored therein and performs predetermined arithmetic operations (exposure calculation and AF calculation) for calculating exposure factors (diaphragm value, shutter speed, etc.), the amount of defocus, and a displacement of a focusing lens to be moved, etc., in accordance with the lens data, based on predetermined algorithm and formulae.

The lens data includes, for example, an apex value Avmin at an open aperture (open F-number), an apex value Avmax at a minimum aperture (minimum aperture F-number), focal length data f, and object distance data, etc.

A part of the lens data varies in accordance with the photographing conditions. Namely, the lens data partly varies in accordance with the object distance in the case of a single focus lens, and varies in accordance with the focal length in the case of a zoom lens, respectively.

Accordingly, in the case of a single focus lens, the object distance is divided into a plurality of object distance zones, so that the lens data corresponding to the object distance zones are, stored in predetermined memory areas of the ROM. In the case of a zoom lens, the focal length is divided into a plurality of focal length zones, so that the lens data corresponding to the focal length zones are stored in predetermined memory areas of the ROM. Namely, the lens data is stored for every photographing condition in a page-address system.

The object distance and the focal length are detected by an object distance detecting device and a focal length detecting device, respectively, so that the lens data stored in the pages corresponding to the data thus detected is outputted to the camera body as renewed lens data.

In the course of manufacturing a photographing lens having a memory, as mentioned above, whether or not the correct lens data is stored at a predetermined address corresponding to the detected object distance or focal length must be checked.

However, upon the checking, it is necessary to actually carry out the zooming operation or the focus adjustment in order to read the lens data corresponding to the detected object distance or the detected focal length, which is troublesome. Furthermore, if the necessary lens data is not obtained, a photographer can not determine whether the problem is caused by an error of the lens ROM or a trouble with the detecting devices, etc.

SUMMARY OF THE INVENTION

Accordingly, a primary object of the present invention is to provide a photographing lens in which lens data stored in a memory can be read without driving a mechanical member, such as a zoom ring, and a camera system including such a photographing lens.

To achieve the object mentioned above, according to the present invention, there is provided a photographing lens that includes a memory means which stores lens data corresponding to a plurality of photographing conditions, and an input and output means for transmitting and receiving data to and from an external device, wherein it comprises a photographing condition detecting means for detecting the photographing conditions of the photographing lens, and a data reading means for reading the lens data corresponding to the photographing condition data detected by the photographing condition detecting means or the photographing condition data input through the input and output means, from the memory means to output the read data through the input and output means.

With this arrangement, all the photographing conditions, for example, the lens data corresponding to focal lengths or object distances, stored in the memory means can be easily read without actuating any member associated with the zooming operation of the focus adjustment.

In a preferred embodiment, the photographing conditions include object distance data, or focal length data in the case of a zoom lens.

According to another aspect of the present invention, the photographing lens further comprises an arithmetic operation means for calculating photographing condition data detected by the photographing condition data detecting means, or lens data corresponding to the photographing condition data inputted through the input and output means to output the calculated lens data through the input and output means.

BRIEF DESCRIPTION OF THE DRAWINGS

The invention will be described below in detail with reference to the accompanying drawings, in which.

DESCRIPTION OF THE PREFERRED EMBODIMENTS

Figure 1:
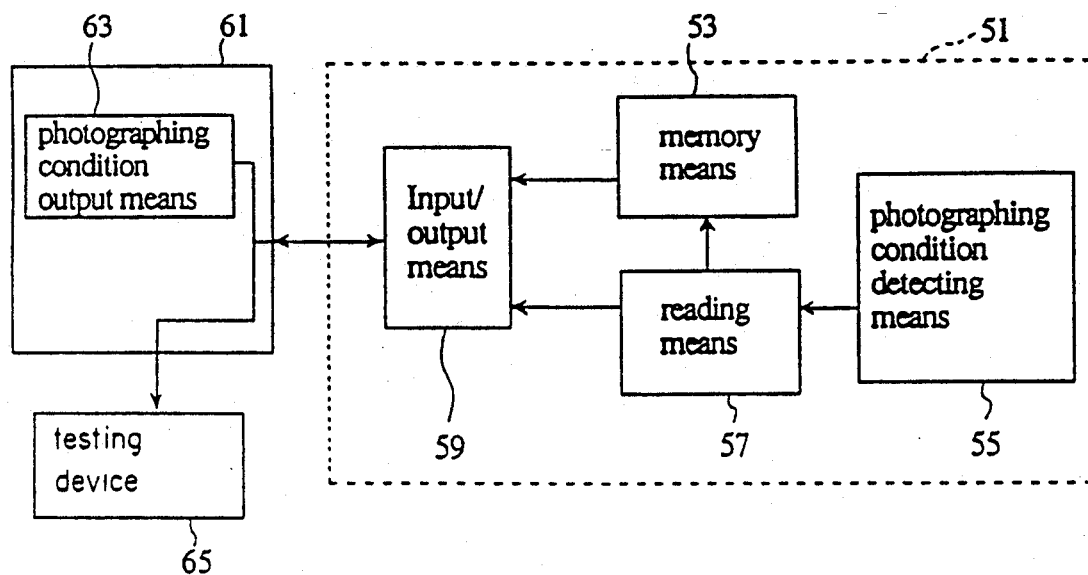
FIGS. 1 and 2 are block diagrams of a circuit arrangement of a main component of a photographing lens according to the present invention.
Figure 2:
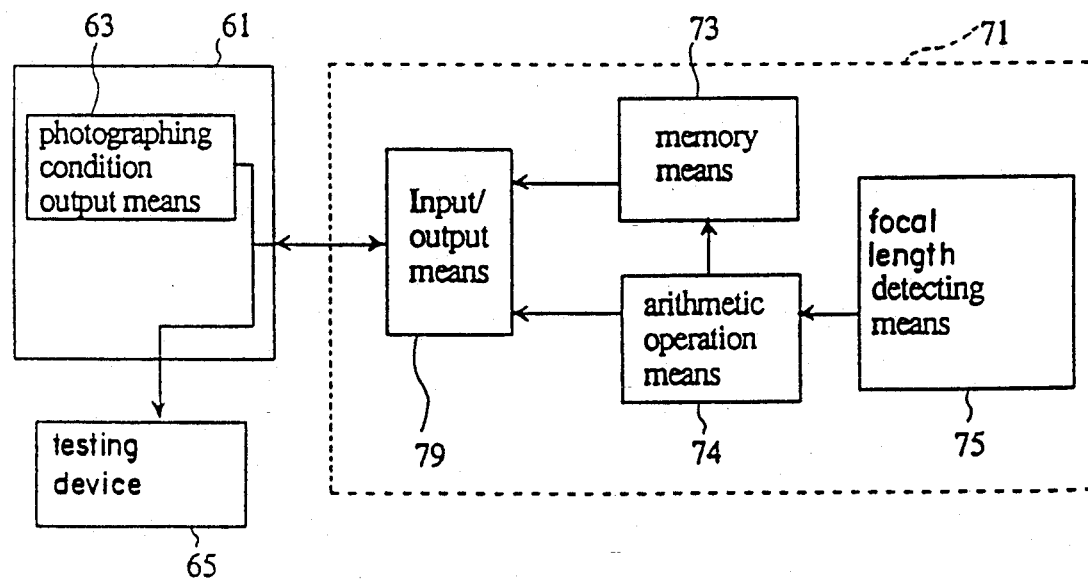

FIG. 1 is a block diagram showing a main component of a camera system according to an aspect of the present invention.

A zoom lens 51 includes a memory means (ROM) 53, in which lens data peculiar to the zoom lens 51, such as focal lengths, open apertures, and minimum apertures is stored, a focal length detecting means 55 for detecting an actual focal length, a reading means 57 for reading lens data corresponding to the actual focal length data detected by the focal length detecting means 55 from the memory means 53, and an input/output means 59 for outputting the data read by the reading means to a camera body (external information means 61).

Specific lens data of the zoom lens 51 varies in accordance with a change in the focal length. To this end, in the illustrated embodiment, the variable focal length is divided into a plurality of focal length zones, so that variable lens data representing respective focal length zones are stored at specific addresses of the memory means 53. The variable lens data includes, for example, a focal length f, an open F-number, a maximum F-number, and a K value, etc. K value data is data on the displacement of a focusing lens needed to move a picture plane by a unit length, and is represented by the number of pulses of an AF pulser 21 in the illustrated embodiment.

In a normal photographing mode, the actual focal length of the zoom lens 51 is detected by the focal length detecting means 55. The lens data stored in the memory means 53 at corresponding addresses thereof is read by the reading means 57, in accordance with the focal length data detected by the focal length detecting means 55, so that the read data is outputted as renewed lens data into the camera body (external data processing means 61) through communication.

The external data processing means 61 has a photographing condition output means 63 which outputs desired focal length data to the reading means 57. The external data processing means 61 is connected to a testing device 65 which analyzes and inspects the lens data outputted from the reading means 57.

The testing device 65 checks the photographing condition data outputted from the photographing condition output means 63 and the lens data read by the reading means 57 and records and indicates the data in a display and prints the same.

FIG. 1 shows a zoom lens 71 to which an embodiment of the present invention is applied, in which the lens data corresponding to a plurality of focal lengths are obtained by calculation. The zoom lens 71 includes a memory means (ROM) 73 in which data necessary to calculate the lens data, based on a predetermined algorithm (calculation formula) is stored. An arithmetic operation means 74 of zoom lens 71 reads the data corresponding to the focal length data detected by a focal length detecting means (photographing condition detecting means) 75 from the ROM 73 to calculate the lens data corresponding to the focal length data. The calculated data is successively outputted to the data processing means 61 through an input/output means 79.

The specific photographing condition data outputted from a photographing condition output means 63 of the external data processing means 61 is inputted to the arithmetic operation means 74 through the input/output means 79. Consequently, the arithmetic operation means 74 performs the calculation in accordance with the specific photographing condition data to obtain the corresponding lens data which is then inputted to the data processing means 61 through the input/output means 79.

Thus, the specific lens data can be inputted from the zoom lens 51 or 71 to the external data processing means 61 without operating the photographing condition detecting means 55 or 75. The specific photographing condition can be set by an external operation. Alternatively, it is also possible to prestore the specific photographing condition in a microcomputer, so that the specific photographing condition can be outputted by the control of the microcomputer.

The following discussion will be directed to an embodiment applied to a single lens reflex camera including a photographing lens having a calculation function of the lens data.

Figure 3:
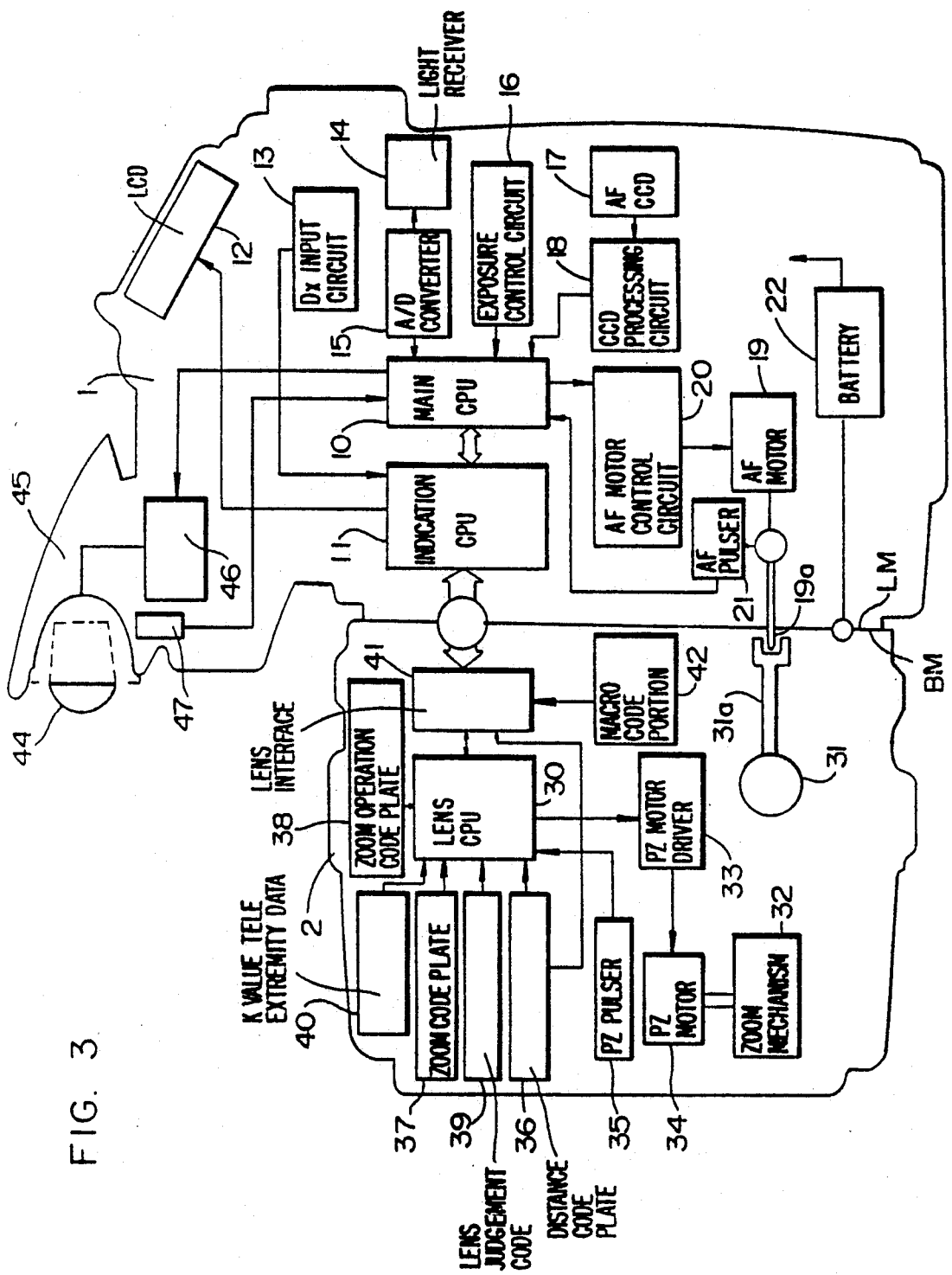
FIG. 3 is a block diagram of a main component of a camera system according to the present invention.

FIG. 3 shows a circuit arrangement of the single lens reflex camera according to the present invention.

A camera body 1 has a main CPU 10 and an indication CPU 11 that functions as control means. The main CPU 10 generally controls the whole camera system and performs arithmetic operations of various data necessary for taking a picture. The indication CPU 11 functions not only as an interface (data communication) to input data by switch members and to transmit and receive data (signals) to and from the zoom lens 2, but also as a controller to control the indication of the photographing data.

The indication CPU 11 is connected to an LCD panel 12 that indicates various photographing data and a DX code input circuit 13 that selectively reads at least ISO sensitivity data of a film from DX codes provided on a surface, of a patrone of the film. A light receiver 14 that receives light incident thereon through the zoom lens 2 to output analog signals of object luminance in accordance with an amount of light received is connected to the main CPU 10 through an A/D converter 15.

The main CPU 10 is also connected to an exposure control circuit 16 that drives and controls a shutter mechanism (not shown) and a diaphragm mechanism (not shown), etc., in accordance with input photographing data, a CCD processing circuit 18 that detects a focusing state of the zoom lens 2 in response to focus data (defocus data) of an object to be taken, outputted from an automatic focusing CCD object distance measuring sensor 17, an AF motor control circuit 20 that drives an AF motor 19, and an AF pulser 21 that detects the angular displacement (rotational angle or number of revolution) of the AF motor 19 to generate pulses corresponding to the angular displacement. The object distance measuring sensor 17 receives light of the object that is incident through the zoom lens 2 to output a predetermined focus information signal.

The AF motor 19 drives the focusing lens of the photographing lens and transmits the drive force to the zoom lens 2 through a coupler 19a provided on a body mount BM of the camera body so as to project therefrom and a coupler 31a provided on a lens mount LM of the photographing lens 2 when the connection between the couplers 19a and 31a is established.

A battery 22 supplies not only electrical powers to the electronic components and electronic circuits within the camera body 1, but also to a motor, electronic components and electronic circuits within the zoom lens 2.

In the zoom lens 2 are provided a lens, CPU 30 as a lens controller, a focusing mechanism 31 that rotates a focus adjusting cam ring (not shown) to relatively move the focusing lens groups in the optical axis direction so as to effect the focusing of the lens, a zooming mechanism 32 which rotates a zoom ring (not shown) to relatively move at least two groups of variable power lenses, in, the optical axis direction to effect a zooming of the lens.

The focusing mechanism 31 is connected to the coupler 31a, which is electrically connected to the coupler 19a when the zoom lens 2 is attached to the camera body 1, as so to transmit a rotational drive of the AF motor 19 to the focusing mechanism 31. The focusing mechanism 31 rotates the focus adjusting cam ring with the driving force needed to drive the focusing lens to effect the focusing operation.

The couplers 31a and 19a can be disconnected from one another by a disengaging means (not shown), so that a photographer can manually rotate the focus adjusting operation ring to adjust the focus (manual focusing) of the lens.

The zooming mechanism 32 is driven by a PZ (power zoom) motor 34, which is in turn driven by a PZ motor driving portion 33. The operation of the PZ motor driving portion 33 is controlled by a lens CPU 30 or a zoom switch SWPZ2 (shown in FIG. 5) in accordance with the power zoom mode. In the manual zoom mode, the operation of the PZ motor driving portion 33 is controlled by a manual operation of a photographer. The switching of the zoom mode between the power zoom mode and the manual zoom mode is effected by the lens CPU 30 in response to an ON/OFF signal of a zoom switch SWPZ1. The zoom switch SWPZ1 is functionally connected to the zoom operation ring. The mechanical switching of the manual zoom mode and the power zoom mode is carried out by a switching means (not shown) which is associated with the zoom operation ring.

To the lens CPU 30 are connected a PZ pulser 35 that generates a predetermined number of pulses in association with an angular displacement of the PZ motor 34, a distance code plate 36 that which reads the position data (object distance data) of the focus adjusting cam ring (focusing lens group) driven by the focusing mechanism 31, a zoom code plate 37 that reads position data (focal length data) of the zooming cam ring (variable power lens group) driven by the zooming mechanism 32, and a zoom operation code plate 38 that inputs data of the direction and speed of the power zooming by the operation of the zoom operation switch. The distance code plate 36 constitutes an initial value data forming means.

If the photographing lens is a single focus macro lens in which the displacement of the focusing lens is increased, the distance code plate 36 can be replaced with the zoom code plate 37 which can provide more information, as an object distance data input means.

Furthermore, a lens judgement code plate 39 that determines the type of photographing lens 2 (zoom lens, single focus lens, or single focus macro lens, etc.), and a K value input member 40 (which inputs data of the K value at a telephoto extremity) are connected to the lens CPU 30.

In the illustrated embodiment, "K value" means the number of pulses of the AF pulser 21 necessary for moving an image plane formed by the photographing lens 2 through a unit displacement, but is not limited thereto.

The distance code plate 36 and the other code plates are usually comprised of code plates which are secured to a cam ring or the like and brushes having a plurality of electrical contacts which are independently brought into slidable contact with the codes of the respective code plates, attached to a stationary ring or the like. The positions of the cam ring, etc., are detected as bit information by a combination of the codes (combination of levels "H" and "L") with which the electrical contacts of the brushes come into contact.

A lens interface 41 is connected to a data input terminal of the lens CPU 30. The data communication between the lens CPU 30 and the indication CPU 11 is effected through the lens interface 41 to which a macro code member 42 which constitutes the initial value data forming means is connected to input macro data thereto at a macro mode.

The lens CPU 30 performs the arithmetic operation to obtain various data, such as a present focal length, a present object distance, etc. The minimum data necessary for the arithmetic operation is stored in an internal ROM 30a of the lens CPU 30.

Circuit of Camera Body

Figure 4:
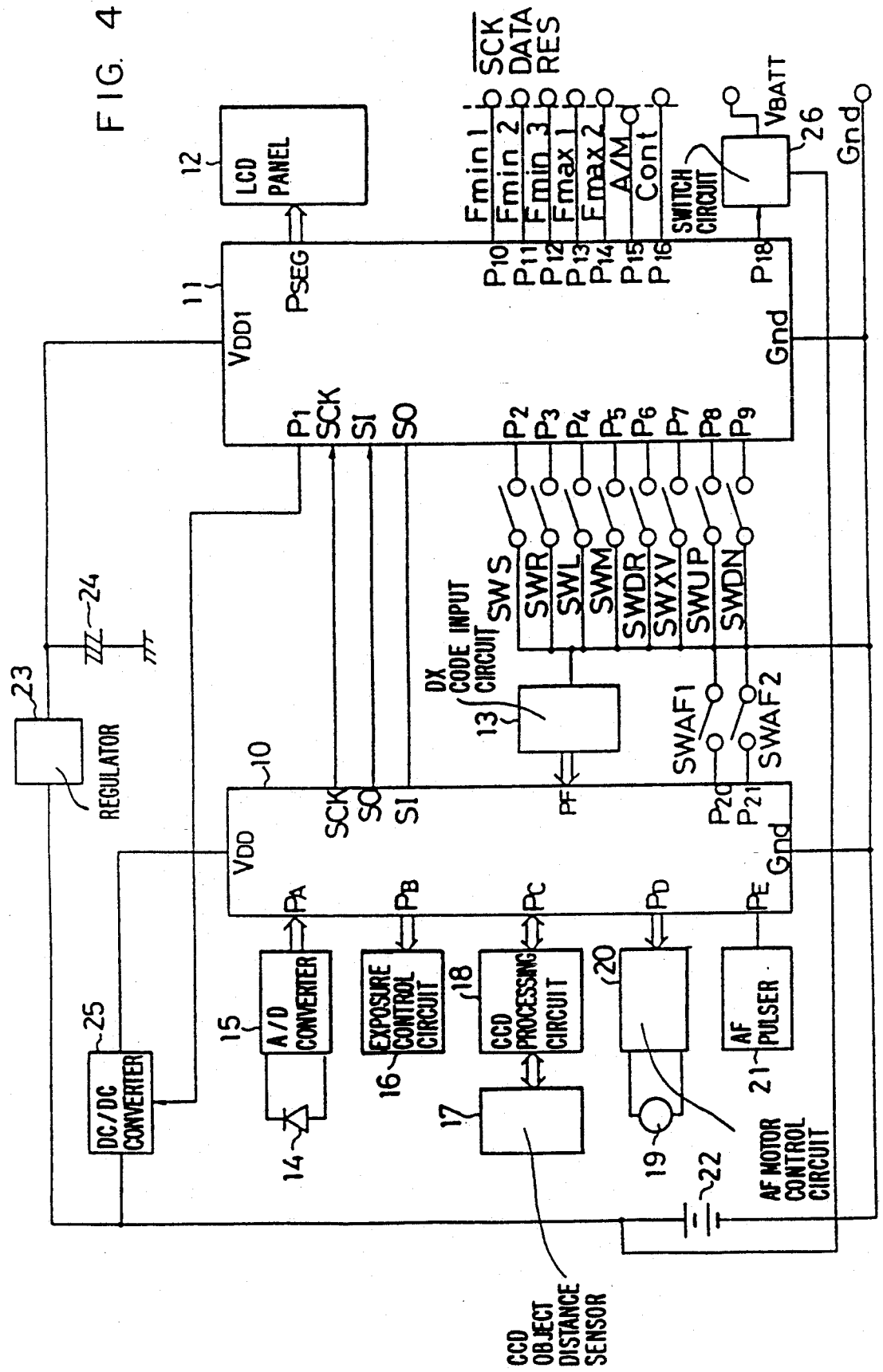
FIG. 4 is a block diagram of a main circuit arrangement of a camera body of the camera system shown in FIG. 3.

The circuit arrangement of the camera body 1 will be described below in detail with reference to FIG. 4.

The voltage of the battery 22, which is controlled by a regulator 23 and which is backed up by a super capacitor 23, is supplied to terminal VDD1 of the indication CPU 11. The indication CPU 11 is always activated at a constant voltage input to the terminal VDD1.

Terminal P1 of the indication CPU 11 is connected to a DC/DC converter 25 which turns ON and OFF the power source of the main CPU 10. Terminal P2 is connected to a photometer switch SWS which is turned ON when a shutter button (not shown) is depressed halfway.

Terminals P3 and P4 of the indication CPU 11 are connected to a release switch SWR which is turned On when the shutter button is fully depressed and a lock switch SWL, which is turned ON when a back cover (not shown) of the camera body is closed to hold the indication CPU 11 etc., into a photographable position, respectively.

The DC/DC converter 25 is actuated when the lock switch SWL is turned ON and when the photometer switch SWS or the release switch SWR is turned ON. In accordance with a command from the indication CPU 11 upon inputting the lens data from the zoom lens 2, the DC/DC converter 25 supplies terminal VDD1 of the main CPU 10 with a reference constant voltage to thereby actuate the, main CPU 10.

Terminals P5, P6, P7, P8 and P9 of the indication CPU 11 are connected to a mode switch SWM, a drive switch SWDR, an exposure correction switch SWXV, an up-switch SWUP and a down-switch SWDN, respectively.

The indication CPU 11 operates in accordance with the operative and inoperative states of these switches SWM, SWDR, SWXV, SWUP, and SWDN. For instance, the exposure modes including a programed exposure mode, an automatic exposure mode, and a manual exposure mode are selected in accordance with the operation of the mode switch SWM. Similarly, drive modes including a single shot mode and a continuous shot mode are selected in accordance with the operation of the drive switch SWDR. The selection modes can be successively varied in accordance with the operation of the up-switch SWUP and down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with the operation of the up-switch SWUP and the down-switch SWDN, respectively.

The indication CPU 11 has a group of indication control terminals PSEG that are connected to an indicating LCD 12 through a bus line The indicating LCD 12 indicates necessary photographing data in accordance with a command of the indication CPU 11 when the lock switch SWL is turned ON.

Seven terminals, P10 through P16 of the indication CPU 11, are connected to electrical contacts Fmin1, Fmin2, Fmin3, Fmax1, Fmax2, A/M, and Cont provided on the body mount BM of the camera body. Terminal P18 of the indication CPU 11 is connected to a switch circuit 26.

The electrical contacts Fmin1, Fmin2 and Fmin3 function as communication terminals for data communication between the zoom lens 2 and the indication CPU 11. Namely, the electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively.

Terminals P10, P11 and P12 of the indication CPU 11 are always pulled up within the indication CPU 11.

The output of the switch circuit 26 is connected to a terminal VBATT and functions as a switch for establishing and breaking the electrical connection between the battery 22 and terminal VBATT in accordance with the level of terminal P18. Terminal Gnd of the indication CPU 11 is connected to ground terminal Gnd of the battery 22.

The indication CPU 11 and the main CPU 10 communicate with each other through serial terminals $\overline{SCK}$, serial-in terminals SI and serial-out terminals SO. In the data communication, data is transferred using command codes, as shown in Table 1 below. In Table 1, the left column represents dada which is outputted from the indication CPU 11 to the main CPU 10, and the right column represents data which is transferred from the main CPU 10 to the indication CPU 11. These data are set based on the measurements of the object luminance and the object distance, etc., controlled by the main CPU 10.

TABLE 1

| Display CPU → Main CPU | Main CPU → Display CPU |
|---|---|
| mode set data | display Tv, Sv data |
| drive set data | film sensitivity information |
| exposure correction set data | AF accommodation pulse number data |
| lens CPU data, set Tv, Sv data | AF return-completion code |
| AF accommodation code | |
| AF return code | |
| AF return pulse number data | |
| AF accommodation, return code | |

Contact groups PA, PB, PC, PD, PE and PF of the main CPU 10 are connected to an A/D converter 15, the exposure control circuit 16, the CCD processing circuit 18, the AF motor control circuit 20, the AF pulser 21, and the DX code input circuit 13, respectively.

Terminal P20 of the main CPU 10 is connected to a first AF switch SWAF1, which selects an auto focus mode in which the focusing is automatically effected by the AF motor 19 and a manual focus mode in which the focusing is manually effected by a photographer. Terminal P21 of the main CPU 10 is connected to a second AF switch SWAF2 which switches the mode of the shutter release between a focus priority mode and a release priority mode.

The first and second AF switches SWAF1 and SWAF2 are mechanically associated with each other, so that, for example, when the manual focus mode is selected by the first AF switch SWAF1, the second AF switch SWAF2 is switched to the release priority mode, Namely, when one of the AF switches SWAF1 and SWAF2 is turned ON, the other is turned OFF.

Circuit of Photographing Lens

The circuit arrangement of the electrical system provided in the zoom lens 2 will be explained below, with reference to FIG. 5.

The lens mount LM of the zoom lens 2 is provided with electrical contacts VBATT, CONT, RES (Fmin3), $\overline{SCK}$ (Fmin1), DATA (Fmin2), GND, Fmax1, Fmax2 and A/M, corresponding to the associated electrical contacts provided on the body mount BM when the zoom lens 2 is attached to the camera body 1. Although the arrangement of the electrical contacts of the lens mount LM is not identical to that of the body mount BM only for clarification, the electrical contacts of the lens mount designated are electrically connected to corresponding electrical contacts of the body mount with the same reference numerals.

Contact VBATT on the lens side is connected to the PZ driver (motor driving portion) 33, so that the power of the battery 22 is directly supplied to the PZ motor 34 through contact VBATT by the switching operation of the PZ driver 33.

Contacts Fmax1 and Fmax2 of the lens side function as a steady information transmitting means for transmitting a maximum F-number data of two bits to the camera body, similar to those provided on an existing (old-type) AE lens. Namely, contacts Fmax1 and Fmax2 on the lens side are grounded through switches SWmax1 and SWmax2, so that maximum F-number (minimum diaphragm value) data is formed in accordance with a combination of the levels of switches SWmax1 and SWmax2, depending on the ON/OFF states thereof in combination. The combinations of the levels of the contacts Fmax1 and Fmax2 on the lens side and the maximum F-number are, for example, as shown in Table 2 below.

TABLE 2

| FNO. | F max2 | F max1 |
|---|---|---|
| 22 | 0 | 0 |
| 32 | 0 | 1 |
| 45 | 1 | 0 |

Contact A/M on the lens side functions to send auto/manual information of the diaphragm to the camera body 1 and is grounded through a selection switch SWA/M. The selection switch SWA/M is in association with the rotation of a diaphragm ring (not shown) of the zoom lens 2, so that, when the diaphragm ring is in the auto position and the manual position, the selection switch is turned ON and OFF, respectively.

Contacts Fmin1, Fmin2, and Fmin3 on the lens side function not only as a steady information transmitting means for transmitting the open F-number information of three bits to the camera body 1, similar to those provided on an existing (old type) AE lens, but also as data communication contacts between the camera body and the zoom lens. The relation between the levels of the contacts Fmin1, Fmin2 and Fmin3 on the lens side and the open F-number is, for example, as shown in Table 3 below.

TABLE 3

| FNO. | F min3 | F min2 | F min1 |
|------|--------|--------|--------|
| 1.4  | 0      | 0      | 0      |
| 1.7  | 0      | 0      | 1      |
| 2    | 0      | 1      | 0      |
| 2.5  | 0      | 1      | 1      |
| 2.8  | 1      | 0      | 0      |
| 3.5  | 1      | 0      | 1      |
| 4    | 1      | 1      | 0      |
| 4.5  | 1      | 1      | 1      |

To provide both the steady information transmitting function and the data communication function on the contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to the contact CONT through fuse portions H1, H2 and H3, so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of contact CONT to drop to ground in order to obtain the open F-number data from the lens contacts Fmin1, Fmin2 and Fmin3. As a result, a transistor (or transistors) Tr to which the fuse portion(s) is (are) connected is (are) turned ON, so that the, emitter(s) of the transistor(s) which has (have) been turned ON become(s) a high level "H," and the emitter(s) of the transistor(s), which has (have) not been turned ON become(s) a ground level. Namely, the transistors Tr are selectively turned ON or OFF in accordance with the connection of the fuse portions H1, H2 and H3 to change the level of the emitters thereof. Consequently, the three-bit open F-number data is outputted to the lens contacts Fmin1, Fmin2 and Fmin3.

Terminals CONT, RES, $\overline{\text{SCK}}$, DATA and GND of the lens interface 41 is connected to terminals CONT, Fmin3, Fmin1, Fmin2 and GND on the lens side, respectively.

Lens contact CONT is connected to the bases of the transistors Tr and to the terminal CONT of the lens interface 41, as mentioned above. The switching of the power supply from terminal CONT of the lens interface is effected through terminal RES (lens terminal Fmin3). After the data on the open F-number is transferred, when terminals CONT and RES become levels "H" and "L," respectively, the power of a reference voltage is supplied to the lens CPU 30.

Terminal VDDB of the lens interface 41 is connected to terminal VDD of the lens CPU 30 through a capacitor C2, so that a constant voltage supplied from terminal CONT of the camera body 1 is supplied to the lens CPU 30.

Terminals DIS1, DIS2 and DIS3 of the lens interface 41 are connected to the distance code plate 36, which constitutes an initial value data forming means, so that distance data signals of the object distance corresponding to the position of the focusing cam ring driven by the focusing mechanism 31 are inputted to terminals DIS1, DIS2 and DIS3.

Terminal MACRO of the lens interface 41 is connected to macro code portion 42, which functions as a macro switch which is turned ON when the zoom operation ring is actuated to switch the zoom lens 2 to the macro mode. When the zoom lens 2 is switched to the macro mode by the operation of the zoom operation ring, the macro code portion 42 can be formed as a part of the codes of the zoom code plate 37.

The input and output terminals of the lens interface 41 are connected to corresponding input and output terminals of the lens CPU 30. Reset terminal $\overline{\text{RESB}}$, clock terminal CLK, serial-in terminal SIS, serial-out terminal SOS, terminal $\overline{\text{CE}}$, terminal $\overline{\text{SOE}}$, terminal Φ IN, and terminal $\overline{\text{KAFEND}}$, of the lens interface 41 are connected to reset terminal $\overline{\text{RESET}}$, serial clock terminal $\overline{\text{SCK}}$, serial-out terminal SO, serial-in terminal SI, terminal P43, terminal P40, terminal PCL and terminal POO of the lens CPU 30, respectively. Terminal CRES of the lens interface 41 is grounded through a delay capacitor C1.

The lens CPU 30 controls the PZ motor 34 through the PZ driver 33 that is connected to the control terminal thereof. The lens CPU 30 is also connected to the PZ pulser 35 and the lens judgement code 39.

Terminals P30, P31, P32 and P33 and terminals P62 and P63, of the lens CPU 30 are connected to the codes of the zoom code plate 37. The lens CPU 30 performs the arithmetic operation based on the input levels of terminals P30, P31, P32, P33, P62, and P63, in combination, to obtain the focal length data or the object distance data in case of a single focus macro lens.

In the illustrated embodiment, the focal length is divided into a plurality of focal length zones. Data, such as focal lengths or the open F-numbers, representing the focal length zones, are set for every focal length zone and stored in the internal ROM 30a of the lens CPU 30 at predetermined addresses thereof.

The lens CPU 30 reads the code of the code plate 37 in response to a command from the camera body 1 to send the corresponding data stored in the ROM to the camera body 1.

Furthermore, terminals P21 through P23 of the lens CPU 30 are connected to various switches, such as an automatic focusing switch SWAF3 and power zoom switches SWPZ1 and SWPZ2, etc. The terminals P24 through P29 are connected to the zoom operation code plate 38. The zoom code operation plate 38 comprises a code plate which is associated with an operation switch (not shown) that is actuated by a photographer to indicate the direction and rotational speed of the PZ motor 34.

The zoom lens 2 has a clock pulse generating circuit 32 that functions as a clock signal generating means, which is connected to clock terminals X1 and X2 of the lens CPU 30. The lens CPU 30 operates synchronously with the clock pulses generated by the clock pulse generating circuit 43. As mentioned above, on the camera body side (indication CPU 11), after terminal CONT drops to level "L" and the open F-number is read, both terminals CONT and RES (Fmin3) become level "H" to reset the lens CPU 30.

When the reset is released, the lens CPU 30 calculates specific data which is then asynchronously set (loaded) in shift register in the lens interface 41 with the clock pulses outputted from the camera body 1. The calculated data is successively outputted from the shift register 41 in accordance with clock signals of the camera body 1. This communication is carried out by the hardware of the lens interface 41. In the illustrated embodiment, specific arithmetic data for 19 bytes is sent to the camera body 1.

Upon completion of the communication (old type communication), terminal $\overline{\text{KAFEND}}$ of the lens interface 41 becomes a level "L", which is a communication completion signal. Consequently, the lens CPU 30 waits for a renewal of data of the communication from the camera body 1.

When the lens CPU 30 receives renewal communication data from the camera body 1, the terminal DATA (Fmin2), which has been at level "H", becomes level "L" and then becomes level "H" again, so that the camera body can commence the new communication. Note that the respective states ("H" and "L") of terminals CONT and RES when the lens CPU 30 is first activated are held.

In the new data communication, the data is transferred from the zoom lens 2 to the camera body 1 or from the camera body 1 to the zoom lens 2, in accordance with command code outputted from the camera body 1. The new data communication is carried out in accordance with the clock signal output from the zoom lens 2. For example, the lens CPU 30 outputs the clock signal from terminal $\overline{\text{SCK}}$ and receives the data outputted from the camera body 1 through the terminal DATA thereof.

If the code is a test code, the lens CPU 30 outputs an acknowledgement signal from terminal DATA and then receives the zoom code outputted from the indication CPU 11 through terminal DATA and stores the zoom code signal in a RAM 30b. After that, an acknowledgement signal of completion of receipt of signal is issued from the lens CPU 30.

Thereafter, when the lens data is read in the state of the test mode, the lens CPU 30 outputs the lens data corresponding to the newly written data from terminal DATA. Upon completion of the output of the lens data, the lens CPU 30 makes the level of terminal DATA "L" and then "H," so that the completion of the data output is transmitted to the camera body 1.

The data communicating between the zoom lens 2 and the camera body 1 is, for example, as shown in Tables 4 and 5 below.

TABLE 4

| lens → body | |
|---|---|
| AF information | 0011.0001(31H) |
| AE information | 0011.0010(32H) |
| all data | 0011.0011(33H) |
| each single bite | 0101.XXXX(5XH) |
| lens information 1 | 0110.0000(60H) |
| lens information 2 | 0110.0001(61H) |
| body → lens | |
| focal length information fWide | 0110.0010(62H) |
| focal length information fTele | 0110.0011(63H) |
| focal length information fX(present) | 0110.0100(64H) |
| lens drive information | 0110.0110(66H) |
| lens accommodation | 1001.0000(90H) |
| lens return | 1001.0001(91H) |
| PH ON | 1001.0010(92H) |

TABLE 4-continued

| PH OFF | 1001.0011(93H) |
|---|---|

TABLE 5

| | lens info. 1 60H | lens info. 2 61H | lens drive info. 66H |
|---|---|---|---|
| Bit7 | PH demand | LENS CPU | fw end |
| Bit6 | AF A/M | | fT end |
| Bit5 | PZ A/M | PZ in LENS | |
| Bit4 | PZ P/A | | |
| Bit3 | PZ MODE | | PZ Far |
| Bit2 | SET SW | | PZ Near |
| Bit1 | LENS A/M | LENS | |
| Bit0 | LENS O/C | version | |

For instance, if the zoom lens 2 has variable focal lengths f from 35 mm to 105 mm (f=35 to 105 mm), and the lens data varies in accordance with the focal length f, the lens data corresponding to the respective focal lengths is stored in the ROM 30a. Table 6 below shows examples of the data stored in the ROM 30a.

TABLE 6

| focal length f | zoom code | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 35 mm | 0000 | 28 | 94 | 68 | 9E | 93 | A3 | 13 | 41 | E0 | 78 | 6A | 38 | 02 | 3B | 6B | FB |
| 135 mm | 1110 | 28 | 94 | 68 | D0 | 7B | 06 | 6D | 61 | D9 | 9A | 58 | 2C | 02 | 48 | 84 | FB |

The lens data to be outputted to the camera body as present lens data of the zoom lens 2 from among the lens data group stored in the ROM 30a is determined in accordance with the focal length data read from the zoom code plate 37 at the mode other than the test mode. Namely, in the illustrated embodiment, the variable lens data is determined by an indirect address designation.

Consequently, if the focal length data is 35 mm, the lens CPU 30 rewrites the address data of the RAM 30b, which designates the address of the ROM 30a in which the corresponding diaphragm data is stored, to address data corresponding to f35 mm.

If the zoom lens 2 of the present invention is attached to an old type camera body, in which only the old communication is permitted, the old communication is performed in accordance with the clock signal outputted from the camera body. Conversely, if an old type photographing lens, in which only the old communication is permitted, is attached to the camera body 1 according to the embodiment of the present invention, the old communication is effected in accordance with the clock signal outputted from the camera body 1.

The following discussion will be directed to the communication between the camera body 1 and the zoom lens 2.

Input operation of Lens Data

A sub-routine for the input operation of the lens data will be described below with reference to FIGS. 6 and 7A-7C. The input operation is performed by the indication CPU 11.

Four lens flags FAE, FCPU, FLROM and FNO for discriminating the lens are set to be "0" (step S40). The lens flag FAE discriminates a conventional (old type) AE lens having no lens ROM; the lens flag FCPU discriminates a new AE lens having a lens CPU, for example, the zoom lens 2 having the lens CPU 30 as shown in FIGS. 3 and 5, etc. Lens flag FLROM discriminates a conventional (old type) AE lens having a lens ROM, and the lens flag FNO, detects that no lens is attached to the camera body or that the lens is wrong or not good (NG) for some reason.

After that, it is checked whether lock flag FLOCK is equal to "1" at step S41. If FLOCK is "0," the control proceeds to step S42. Conversely, if FLOCK is "1," control jumps to step S53.

At step S42, terminals P10 through P12, which are used for serial communication with the zoom lens 2, are set to the input mode, and then, the level of terminal P16 (contact Cont) is checked to determine whether a reference voltage is supplied thereto (steps S43 and S44).

If there is no contact Cont on the mounted lens side, contact Cont on the camera body side comes into contact with the surface of the lens mount and is accordingly grounded to detect that the mounted lens is an old type AE lens having no lens ROM.

When the mounted lens is the old type AE lens, the levels of terminals P10 through P15 are inputted to read the data on the open F-number and the minimum F-number and the diaphragm A/M switching data, and the old AE lens flag FAE is set "1" (steps S45 and S46). Then, control is returned.

If no photographing lens is mounted, or if a lens having the lens data is mounted, the level of the Cont contact is "H." Consequently, level of the terminal P16 falls to "L" to stop the supply of the electrical power to the lens side. Thereafter, the levels of the other terminals P10 through P15 are inputted (step S48).

Figure 5:
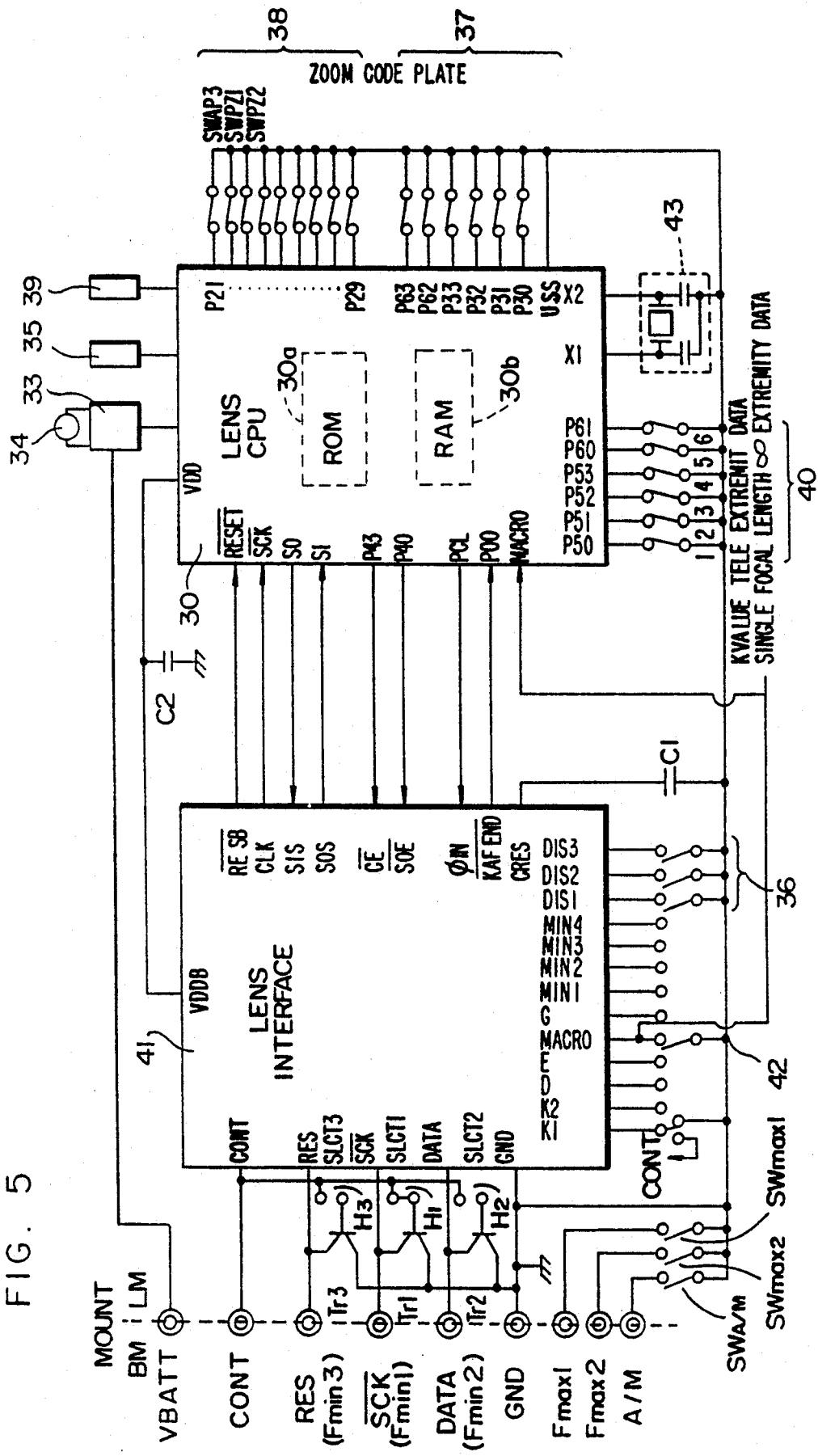
FIG. 5 is a block diagram of a main circuit arrangement of a photographing lens of the camera system shown in FIG. 3.
Figure 6:
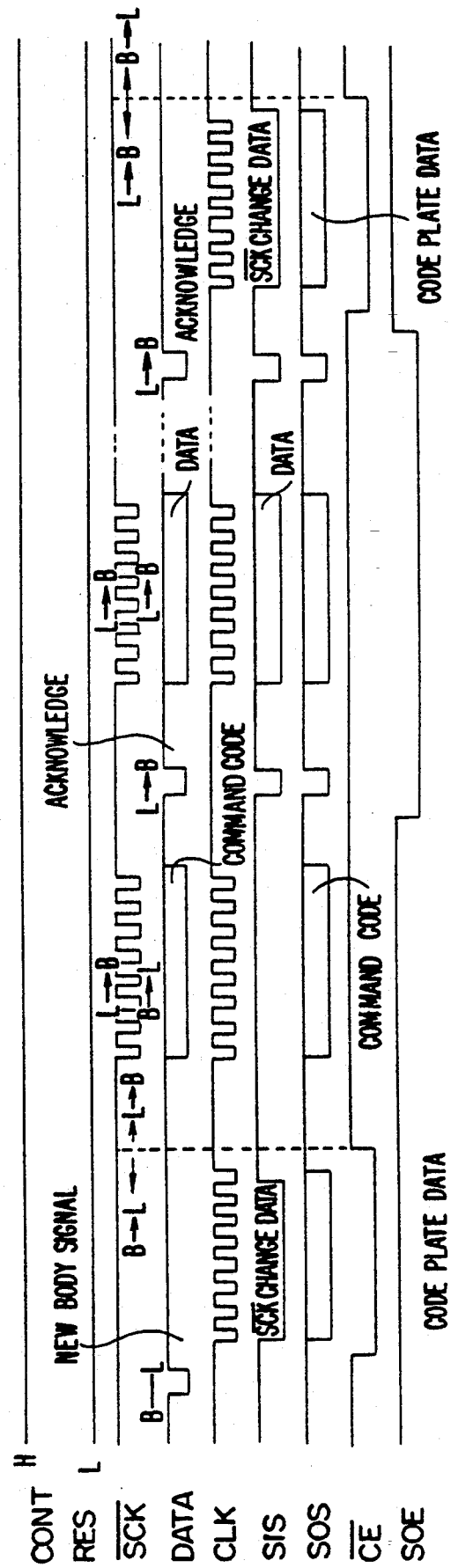
FIG. 6 is a timing chart showing a communication between the camera body and the photographing lens of a camera system according to the present invention.
Figure 7A:
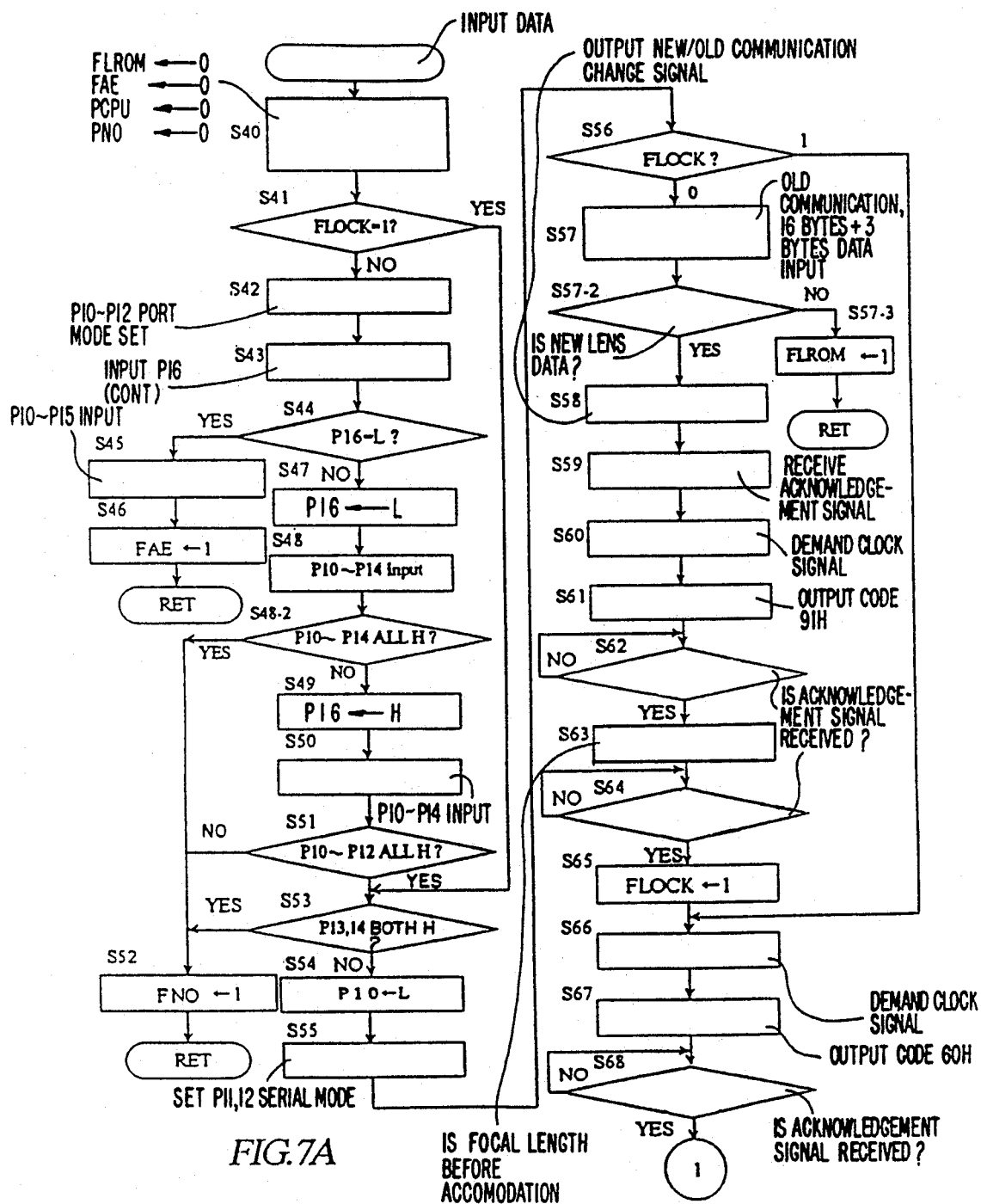
FIGS. 7A-7C are flow charts of communication operations on the camera body side.
Figure 7B:
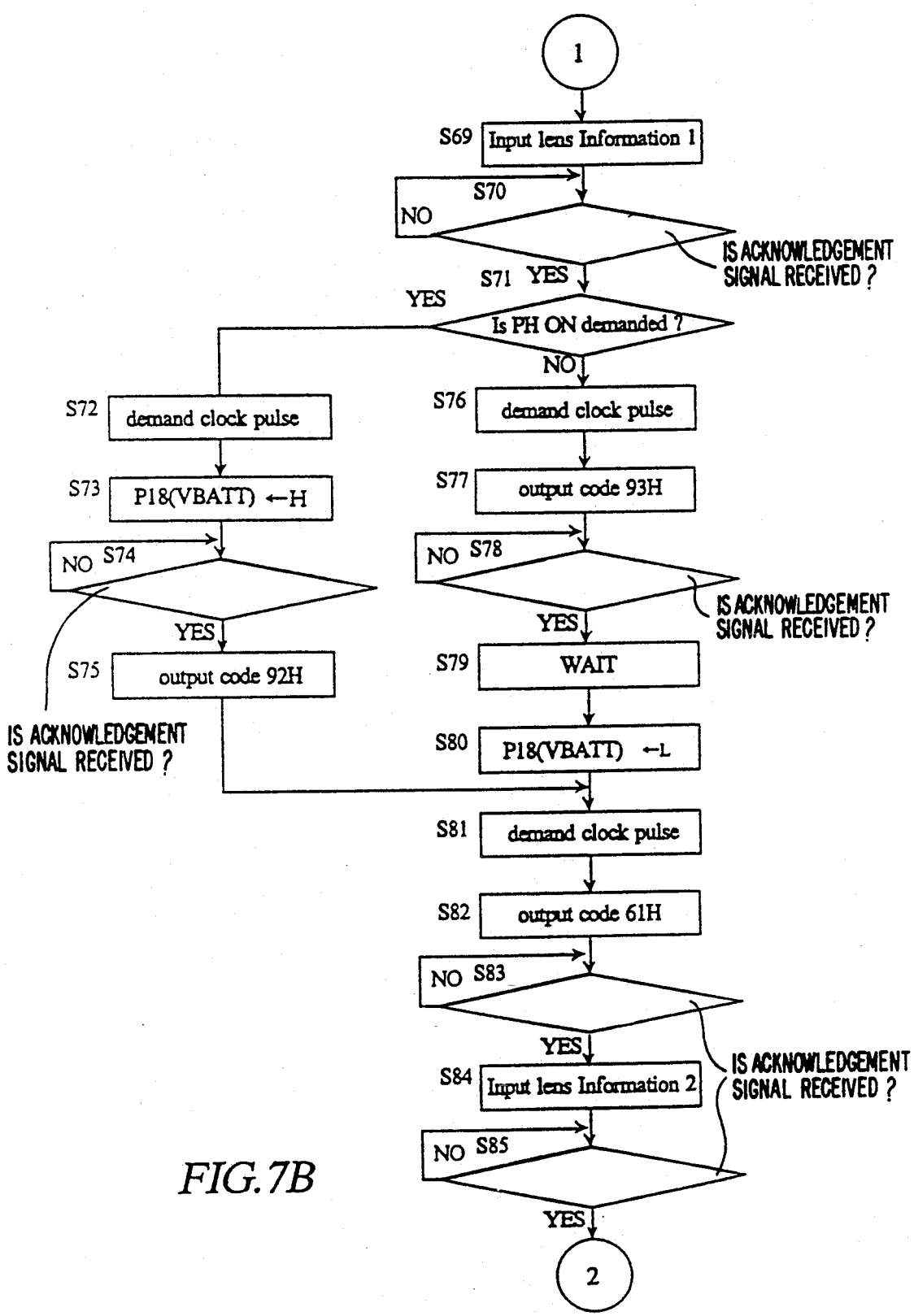
Figure 7C:
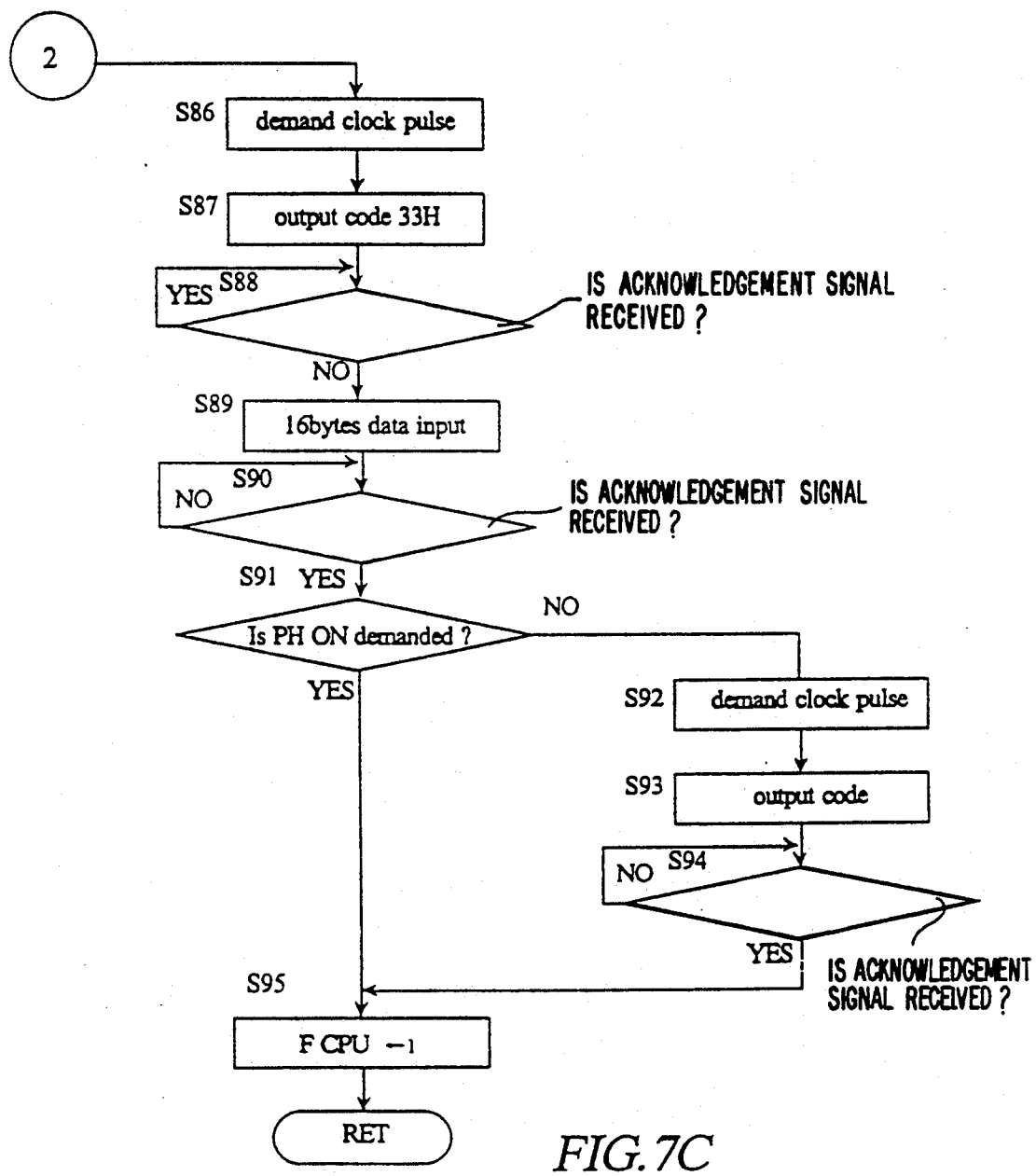

As can be seen in FIG. 5, when the transistors Tr are connected to the lens contacts Fmin1 through Fmin3, the open F-number can be detected in accordance with the levels of the lens contacts Fmin1 through Fmin3 in combination, depending on the state (ON and OFF) of the transistors Tr in combination. The maximum F-number can be detected in accordance with the levels of the lens contacts Fmax1 and Fmax2 in combination, depending on the state (ON and OFF) of the switches SWFmax1 and SWFmax2 in combination. The level of the diaphragm A/M contact is used to detect whether the diaphragm is automatic or manual.

Thereafter, if it is checked at step S48-2 whether, the levels of the terminals P10 through P14 are all "H". If the levels of P10 through P14 are all "H," the no lens flag FNO, which represents an absence of a lens, is set to "1" at step S52. Thereafter, control is returned.

If any of the levels of the terminals P10 through P14 is "L," the level of terminal P16 is set to "H," so that electrical power is supplied to the zoom lens. Thereafter, the lens CPU and the lens ROM are activated and the levels of terminals P10 through P14 are inputted (steps S49 and S50).

Whether the levels of the terminals P10, P11 and P12 are all "H" is checked at step S51. If any of the terminals P10 through P12 is "L", the photographing lens is considered to have a trouble with the lens ROM and lens CPU, and accordingly, the no lens flag FNO is set to "1" (step S52).

If the levels of the terminals P10 through P12 are all "H," it is determined at step S53 whether or not the levels of terminals P13 and P14 are both "H". If the levels of the terminals P13 and P14 are both "H," it is considered that no lens is attached, so that the no lens flag FNO is set and control is returned (steps S53 and S52).

If at least one of the terminals P13 and P14 is "L," level of the terminal P10 falls to "L" (step S54), and terminals P11 and P12 are set to be the serial communication mode (step S55), since the mounted lens is a new AE lens (i.e., the zoom lens 2). Thereafter, control proceeds to step S56.

At step S56, whether lock flag FLOCK is "1" is checked. If flag FLOCK is "0," control proceeds to step S57, and if flag FLOCK is "1," control jumps to step S66.

At step S57, the lens data of 16 bytes and rear converter data of three bytes are inputted by the old communication.

When the inputting of the data by the old communication is completed, it is determined whether lens is a new lens having the lens CPU (zoom lens 2), in accordance with a part of the inputted data at step S57-2. If the lens is not a new lens, flag FLROM is set, since the lens is a conventional AE lens having a lens ROM (step S57-3).

Conversely, if the lens is the new lens, the new/old communication switching signal is outputted from the terminal DATA (step S58), so that the clock demand signal is outputted to the lens side in response to the acknowledgement signal issued from the lens side, whereby the lens CPU 30 outputs the clock signal (steps S58 through S60).

Thereafter, a lens return command code 91H is sent to the lens CPU 30, which commences the return of the power zoom mechanism at step S61. Control waits until the acknowledgement signal is issued from the lens CPU 30 (step S62).

Upon receipt of the acknowledgement signal, the focal length data before accommodation (retraction) is sent to the lens CPU 30, which then performs the power zoom returning of the zoom lens to the focal length before the retraction operation (step S63). When the power zoom returning is finished, which can be detected by the issuance of the acknowledgement signal from the lens CPU 30, lock flag FLOCK is made "1" (steps S64 and S65). Thereafter, control proceeds to step S66.

At step S66, a clock demand signal is outputted so that the lens CPU 30 outputs the clock signal. Command code 60H is synchronously outputted the clock signal, and control does not proceed until the acknowledgement signal is issued (steps S67 and S68). Command code 60H is used to read lens data, including the switch setting data, on the lens side and the power hold demand signal, etc.

Upon receipt of the acknowledgement signal, the lens data outputted from the lens CPU 30 is received (step S69). The completion of the receipt of the lens data is detected by the receipt of an acknowledgement signal fed from the lens CPU 30 (step S70).

Upon receipt of the acknowledgement signal, whether the power hold is demanded is checked at step S71. If there is a power hold demand, the lens CPU 30 is requested to output the clock signal (step S72). Thereafter, the level of terminal P18 becomes "H" and the control does not proceed until the acknowledgement signal is issued from the lens CPU 30 (steps S73 and S74).

Upon receipt of the acknowledgement signal, the power hold-on code 92H is outputted (step S75). Thereafter, control proceeds to step S81.

If there is no power hold demand at step S71, the output of the clock signal is demanded at step S76. Thereafter, the power hold-off code 93H is synchronously outputted with the clock signal (step S77). After that, whether the acknowledgement signal is outputted from the lens CPU 30 is checked at step S78.

Upon receipt of the acknowledgement signal, the level of terminal P18 becomes "L" after a lapse of a predetermined period of time time (steps S79 and S80) so as to stop the supply the power to the PZ motor 34. Then, the control proceeds to step S81.

At step S81, the output of the clock signal is demanded. The demand code 61H, for demanding the lens data 2 is synchronously outputted with the clock signal at step S82. Thereafter, it is checked at step S83 whether the acknowledgement signal is outputted.

If the acknowledgement signal is received, the subsequent lens data 2 is received at step S84. Thereafter, it is checked at step S85 whether the acknowledgement signal is outputted.

If the acknowledgement signal is received at step S85, the clock signal is demanded at step S86. The demand code 33H for demanding all the data is synchronously outputted with the clock signal at step S87. Thereafter, whether the receipt acknowledgement signal is received is checked at step S88.

If the receipt acknowledgement signal is received, the subsequent data for 16 bytes is inputted at step S89. Thereafter, whether the transmission completion acknowledgement signal is received is checked at step S90.

If the transmission completion acknowledgement signal is received at step S90, whether there is a power hold demand is checked at step 91. If there is a power hold demand, the new AE lens flag FCPU is set to "1" (step S95). Then, the control is returned.

Conversely, if there is no power hold demand at step S91, the clock signal is demanded at step S92 and a predetermined code is outputted (step S93). Thereafter, whether the receipt acknowledgement signal is received is checked at step S94.

Main Routine of Lens CPU

Figure 8:
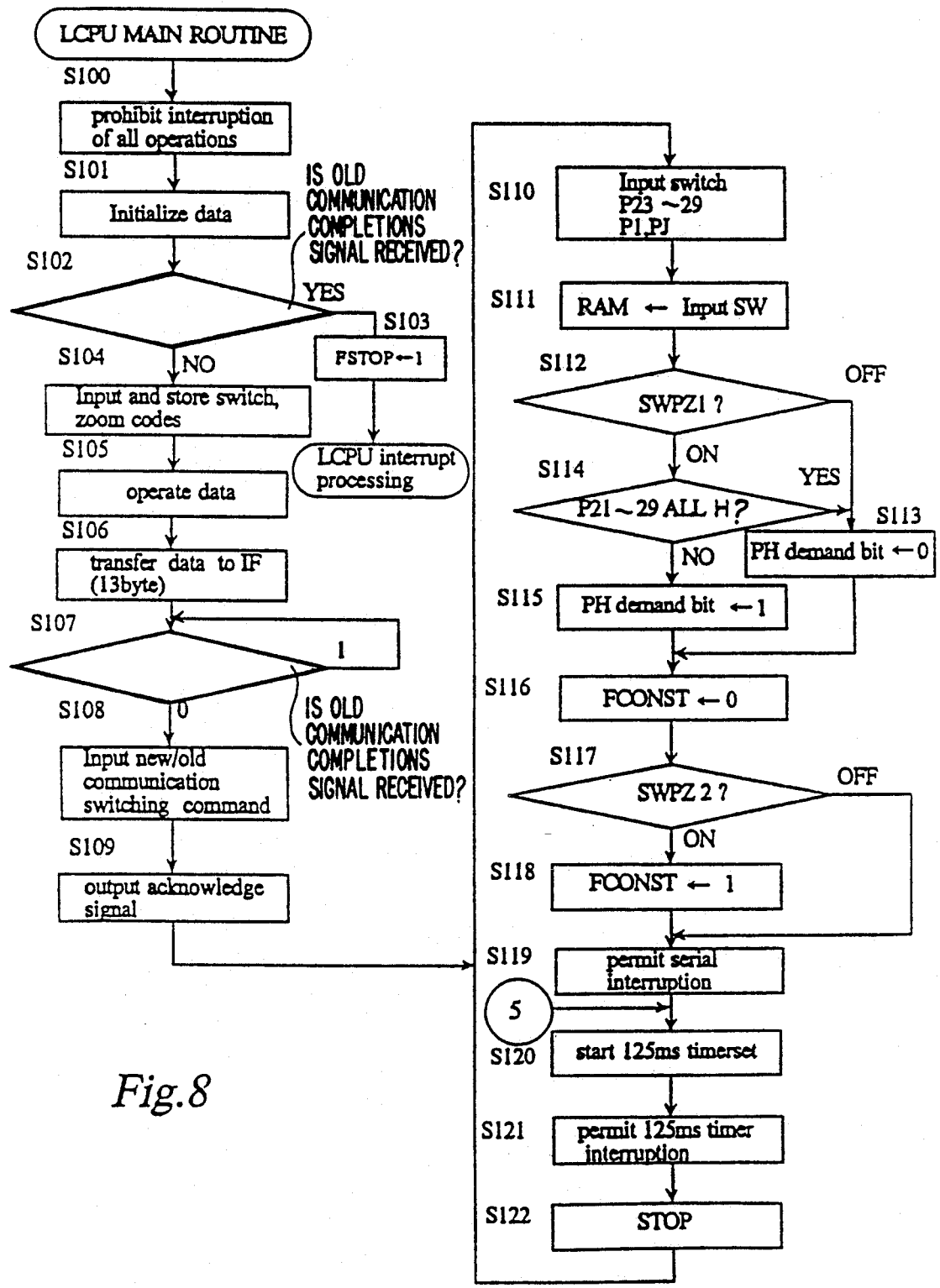
FIG. 8 is a flow chart of a main operation of a lens CPU.

The main operation of the lens CPU 30 will be described below with reference to FIG. 8. The lens CPU 30 is supplied with electrical power from the indication CPU 11 through the terminal Cont and starts when the reset is released after the levels of terminal Cont is set to "H" and terminal RES is set to "L".

The lens CPU 30 performs the initialization after interruption by all of the operations is prohibited (steps S100 and S101).

After the initialization is completed, whether the old communication completion signal is outputted from the lens interface 41 is checked. That is, whether the level of terminal $\overline{\text{KAFEND}}$ is "L" is checked at step S102. If the old communication completion signal is outputted, stop flag FSTOP is set to "1", and then, a lens CPU interruption starts (step S103).

Conversely, if no old communication completion signal is outputted which means that control is still in the old communication, the states of the switches are inputted and stored in the RAM 30b, to successively perform the predetermined arithmetic operations (step S105). During these operations, the initial value data is loaded in the 24 bit shift register in which the data is shifted and serially output to the indication CPU 11, by hardware.

Every time the predetermined arithmetic operations are finished, the results of the arithmetic operations (arithmetic data) are outputted to the lens interface 41 (step S106). The arithmetic data outputted to the lens interface 41 is then loaded in the 24 bit shift register after the initial data by hardware, and successively transferred to the indication CPU 11 through the terminal DATA.

Upon completion of the output of the arithmetic data to the indication CPU 11, whether the old communication completion signal is outputted is checked at step S107.

When the old communication completion signal is received, the arithmetic data transferred to the lens interface 41 is transferred to the indication CPU 11. If there is provided a rear converter, the data for three bytes is transferred to the indication CPU 11 from the rear converter.

Upon completion of the transfer of the initial data of three bytes, the arithmetic data of 13 bytes, and the rear converter data of three bytes, the lens interface 41 outputs the old communication completion signal. Thereafter, when the indication CPU 11, which receives the old communication completion signal, receives the output new/old switching signal, the acknowledgement signal is issued (steps S108 and S109). Consequently, control is ready for a new communication.

In the new communication, the levels of terminals P23 through P29 are inputted at step S110, and the states of the switches are memorized in the internal RAM (step S111).

Thereafter, the state of the power zoom switch SWPZ1 is checked to determine the power zoom mode or the manual zoom mode at step S112. If the power zoom switch SWPZ1 is hold demand bit (flag) is set to "0" to stop the supply of power to the PZ motor 34. Thereafter, control proceeds to step S116

If the power zoom switch SWPZ1 is turned ON, the mode is the power zoom mode. Accordingly, the levels of terminals P21 through P29 are input to check the states of the switches relating to the zooming operation (step S114). If the levels of all of the terminals P21 through P29 are "H," since no operation for the power zooming is effected, the power hold demand bit is made "0." Thereafter, control proceeds to step S116.

If the level of any of the terminals P21 through P29 is "L," since the switch connected to the associated terminal, relating to the power zooming is turned ON, the power hold demand bit is set to supply the PZ motor 34 with power (step S115). Thereafter, control proceeds to step S116.

At step S116, a constant image magnification flag FCONST is 0. Then control proceeds to step S117. The constant image magnification flag FCONST detects whether the constant image magnification mode is set. In the illustrated embodiment, the constant image magnification mode referred to means a mode in which, when an object of an object distance D is in focus at a specific focal length f, even if there is a small change ΔD in the object distance, the power zooming is controlled to adjust the focal length f' to satisfy the following relationship;

$$D/f = (D + \Delta D)/f'$$

At step S117, whether the power zoom switch SWPZ2 is turned ON is checked. If the power zoom switch SWPZ2 is turned ON, the constant image magnification flag FCONST is set to "1". Then, the control proceeds to step S119. Conversely, if the power zoom switch SWPZ2 is turned OFF, control directly proceeds to step S119 without setting the constant magnification flag FCONST to "1."

After that, at step S119, the serial interruption is permitted. Thereafter, a timer operation is set to intermittently perform the routine of steps S110 through S122 at a 125 ms cycle at steps S120 through S122. Thereafter, the operation stops. The lens CPU 30 performs the operations of steps S110 through S122 every 125 ms, in accordance with the setting of the timer operation.

Serial Interruption of Lens CPU

Figure 9A:
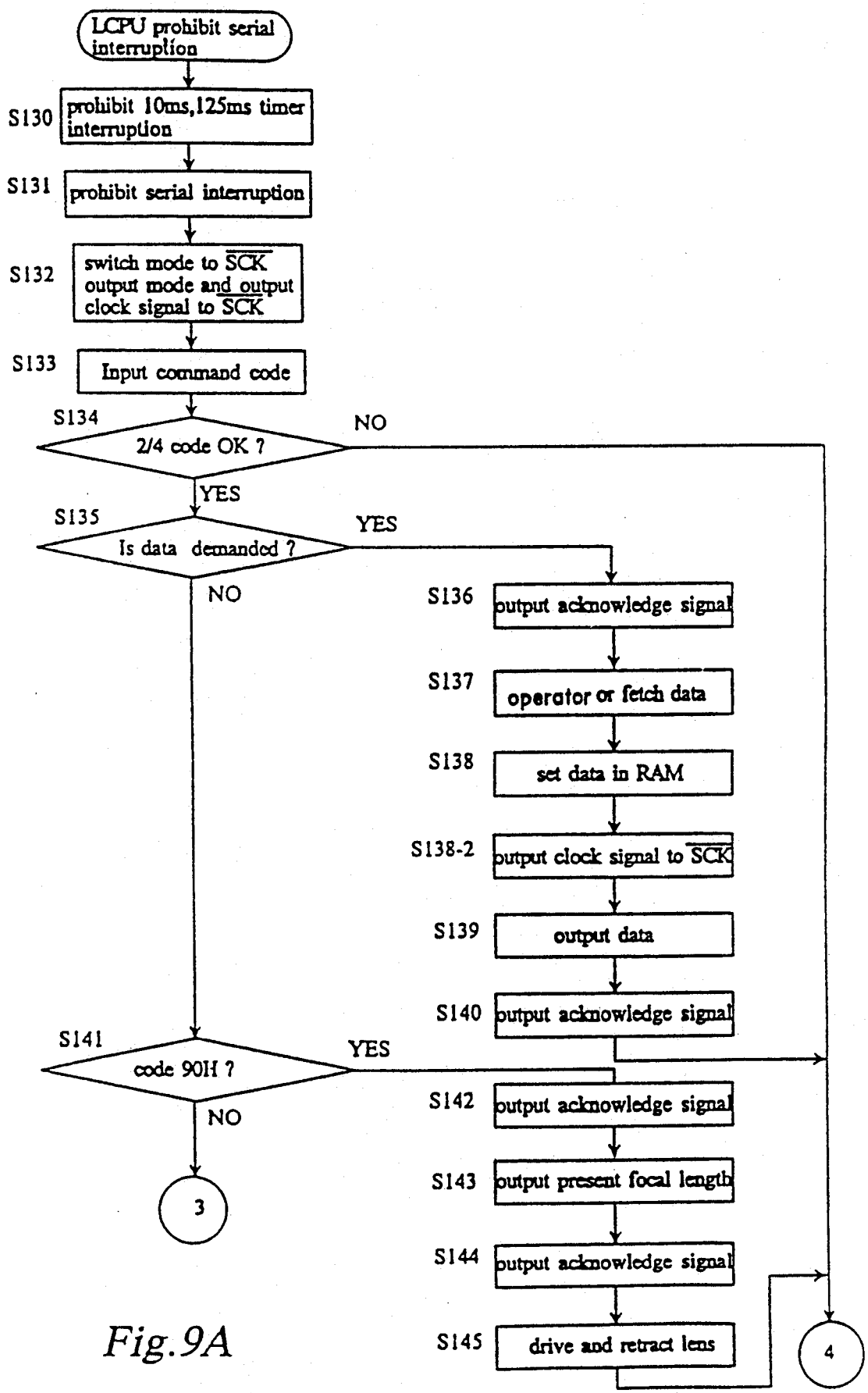
FIGS. 9A-9C are flow charts of a communication operation on the photographing lens side.
Figure 9B:
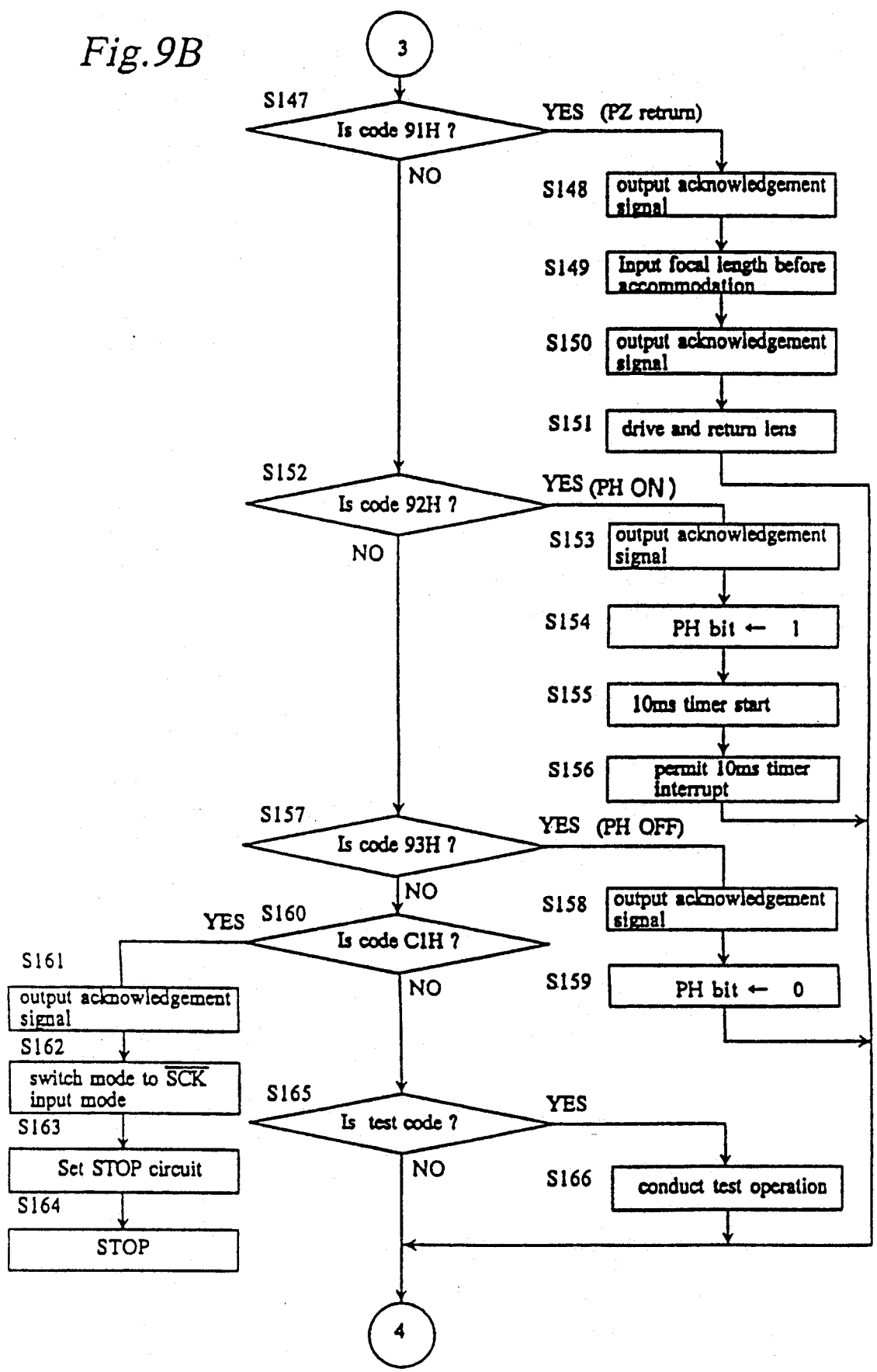
Figure 9C:
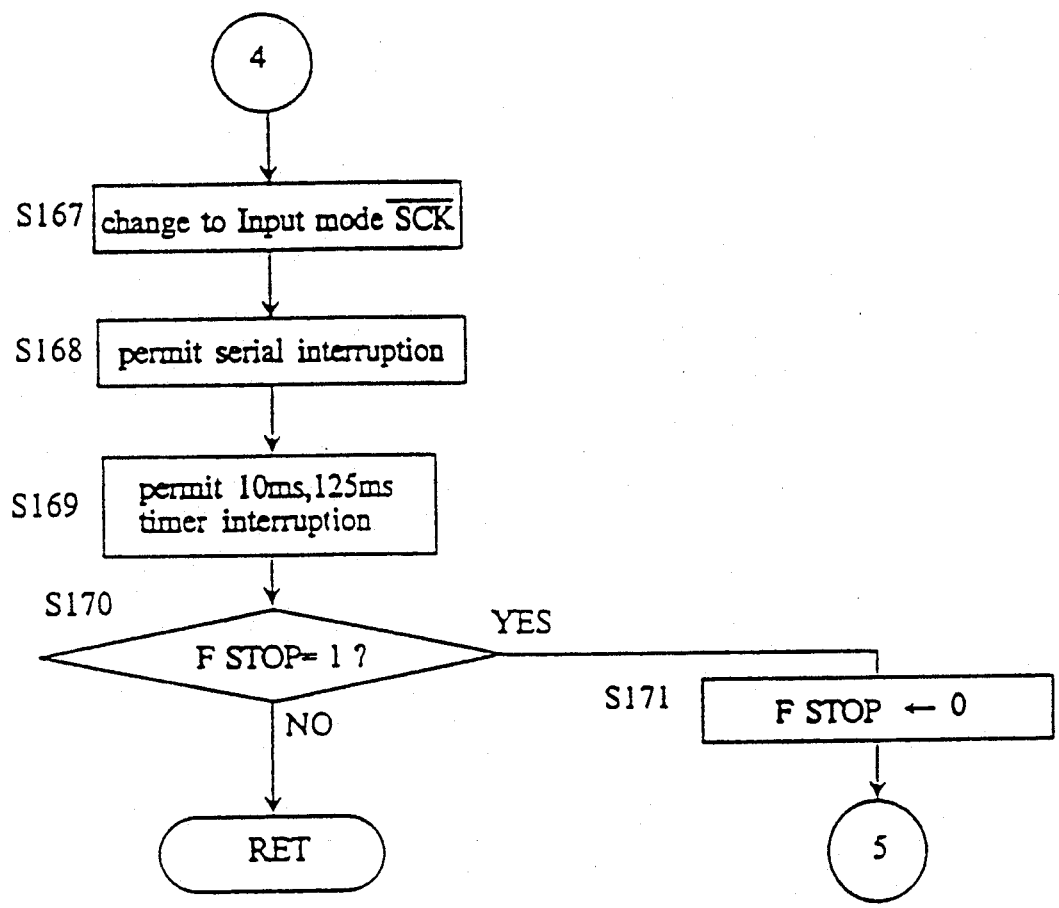

FIGS. 9A through 9C show flow charts for the new communication operation when the serial communication is interrupted by the indication CPU 11 of the camera body 1. When the indication CPU 11 causes the level of terminal DATA to fall to "L," the lens CPU 30 enters the new communication operation.

First, the lens CPU 30 prohibits the timer interruption by 10 ms timer, the 125 ms timer and the serial interruption (steps S130 and S131). Note that the 10 ms timer interruption is a power zoom control operation, in which, when the serial interruption is permitted, the power zooming is controlled at an interval of 10 ms.

Thereafter, the mode is switched to the $\overline{SCK}$ output mode in which the clock signal is outputted from the lens CPU 30 to output the serial clock signal to terminal $\overline{SCK}$ (step S132). Communication with the camera body 1 is carried out synchronously with the clock signal outputted from the photographing lens 2.

At step S133, a command code from the indication CPU 11 is inputted.

Thereafter, whether a 2/4 code inputted command code is correct is checked at step S134. The 2/4 code means the first four bits of the command code, of which two bits are always "H" and the remaining bits (two bits) are always "L." If these requirements are not satisfied, no operation is performed, as an input error of the command code is assumed. Thus, control jumps to step S167. At step S167, the mode, is switched to the $\overline{SCK}$ input mode in which the serial clock is inputted from the camera body side. Thereafter, the 10 ms timer interruption, the 125 ms timer interruption and the serial interruption are permitted (steps S168 and S169). At step S170, if the stop flag FSTOP set to is "0," control is directly returned, while, the stop flag FSTOP is set to "1," the control is returned to step S120 of the CPU main routine shown in FIG. 8 after the stop flag FSTOP is set to "0" (step S171).

If the 2/4 code is correct, whether the command code is the data demand signal is checked at step S135. If the command code is the data demand signal, the acknowledgement signal is outputted to calculate the demanded data or to input the data of the code plate and the switches etc., so as to memorize the data in the internal RAM (steps S136 through S138).

The memorized data is serially outputted synchronously with the $\overline{SCK}$ clock signal at step S138-2. Upon completion of the output of the memorized data, the acknowledgement signal is outputted to complete the data transfer (steps S138-2, S139 and S140). Thereafter, control proceeds to step S167.

If the first four bits are not the command code, whether the latter is a code 90H, 91H, 92H, or 93H, or a sleep code or the test code is checked (steps S141, S147, S152, S157, S160 and S165).

If the command code is code 90H (lens accommodation or retraction), the acknowledgement signal is sent to the indication CPU 11 (step S142). Thereafter, the present focal length data is sent from the zoom code plate 37 to the indication CPU 11 (step S143) Upon completion of the feed of the focal length data to the indication CPU 11, the acknowledgement signal is outputted to accommodate or retract the zoom lens (steps S144 and S145). Thereafter, control proceeds to step S167 (FIG. 15C).

If the command code is code 91H (lens return), the receipt acknowledgement signal is sent to the indication CPU 11 (step S148). Thereafter, the focal length data before accommodation is inputted from the indication CPU 11 (steps S149). Upon completion of the inputting of the focal length data before accommodation, the acknowledgement signal is outputted to finish the inputting of the focal length data before accommodation (step S150). Thereafter, the PZ motor 34 is driven to set the focal length to be the focal length before accommodation at step S151. Thereafter, control proceeds to step S167.

If the command code is code 92H, (power, hold ON), the receipt acknowledgement signal is outputted at step S153. Thereafter, the power hold demand bit PHbit is set to "1" (step S154), and the 10 ms timer starts to permit the 10 ms timer interruption (steps S155 and S156). Thereafter, control proceeds to step S167.

If the command code is code 93H (power hold OFF), the acknowledgement signal is outputted (steps S157 and S158), and the power hold bit is set to "0" (step S159). Thereafter, control proceeds to step S167.

If the command code is neither code 90H, 91H, 92H or 93H, whether the command code is sleep code C1H is checked at step S160. If the command code is the sleep code C1H, the receipt acknowledgement signal is outputted to change the mode, to the $\overline{SCK}$ input mode in which the level of terminal $\overline{CE}$ falls to "L" (steps S161 and S162). Thereafter, control stops and sleeps (step S164).

If the command code is not the sleep code C1H, whether command code is test code FXH is checked at step S165. If the command code is the test code FXH, the test operation is performed at step S166, and then, control proceeds to step S167. If the command code is not the test code FXH, control skips step S166 and proceeds directly to step S167. The test mode is not used during the taking of a picture, but is used to effect a predetermined data communication, without the need to mount the photographing lens to the camera body, for example, upon assembly of the lens or adjustment thereafter, etc.

At step S167, the mode is changed to the $\overline{SCK}$ input mode, in which the clock signal can be received from the indication CPU 11. Thereafter, the serial interruption, the 10 ms timer interruption and the 125 ms timer interruption are permitted (steps S168 and S169).

Thereafter at step S170, whether stop flag FSTOP is set to "1" is checked. If FSTOP is "1," it is set to "0" (step S171). Control is then is returned to step S120 of the main routine of the lens CPU (FIG. 7). Conversely, if FSTOP is "0" at step S170, control is returned.

Test Mode

Figure 10:
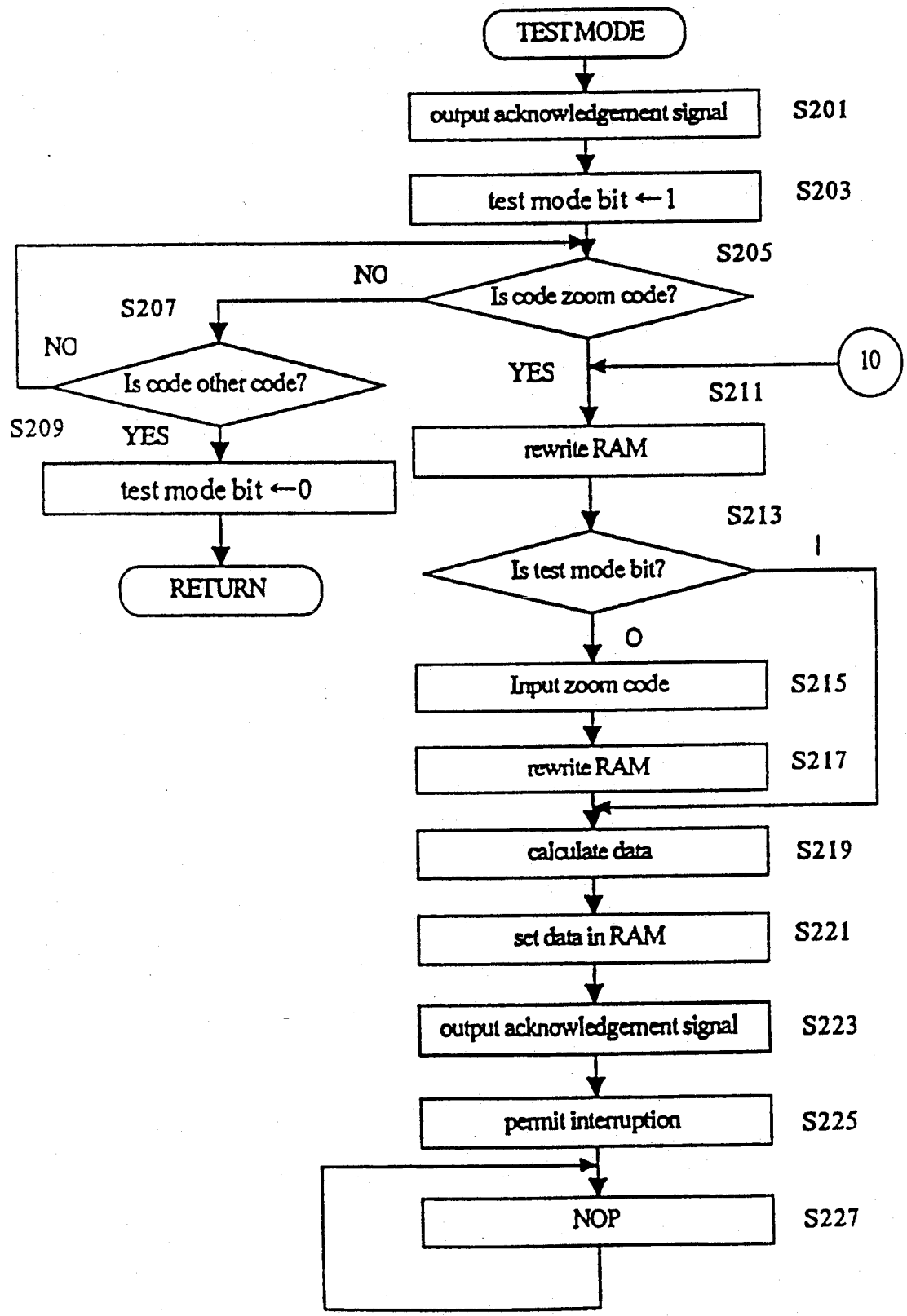
FIGS. 10 and 11 are flow charts of a test mode operation on the photographing lens side; and, FIG. 12 is a flow chart of a test mode operation on the camera body side (testing device).
Figure 11:
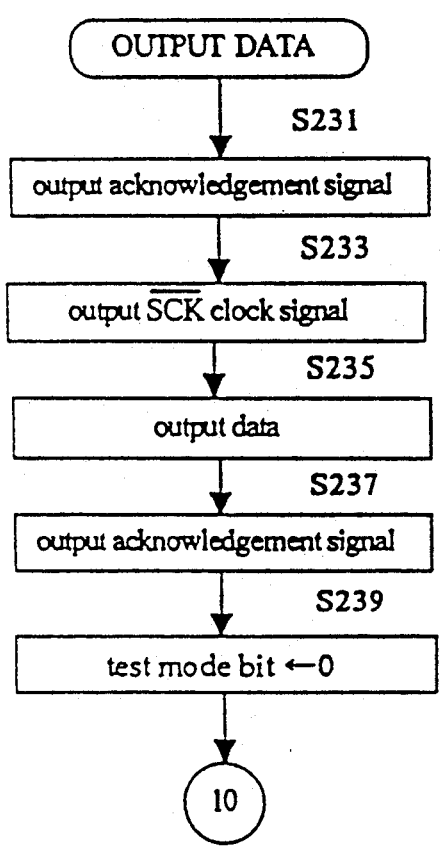
Figure 12:
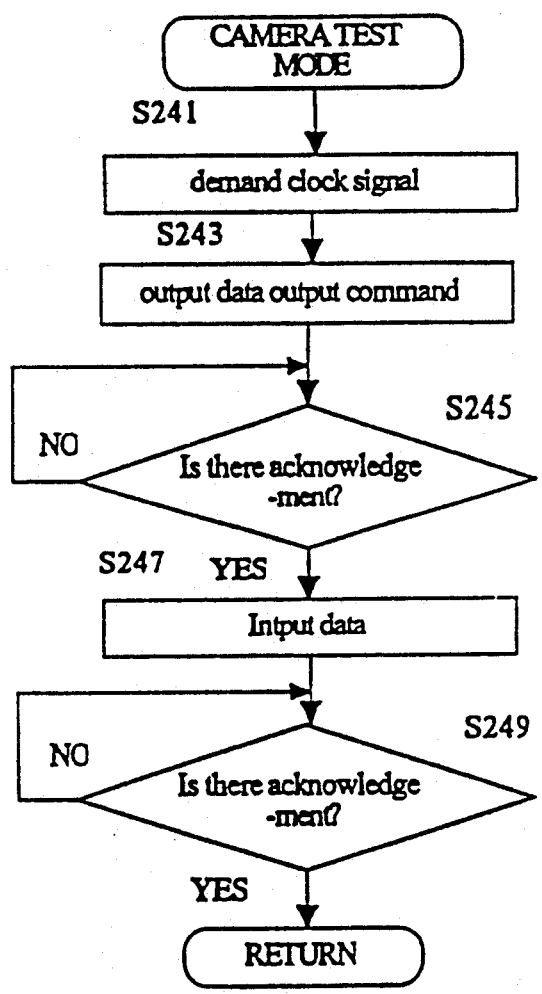

The operation of the lens CPU at the test mode will be discussed below with reference to FIGS. 10 through 12. Note that the normal test is carried out by connecting the zoom lens 2 to the data processing circuit 61. For simplification, it is assumed that the camera body 1 has a test function similar to the data processing circuit 61 in the following description.

When the test code is outputted from the camera body 1, control enters a sub-routine for a test operation at step S166 from step S165. Namely, the test operation shown in FIG. 10 starts.

At the test mode, the acknowledgement signal of the test code is outputted at step S201 and sets the test mode bit to be "1" at step S203. Control does not proceed until the zoom code (address data) is outputted from the camera body 1 (step S205). If the code other than the zoom code is output from the camera body 1, the test mode bit is set to "0," and then, control is returned (steps S207 and S209).

Upon receipt of the zoom code, the lens CPU 30 rewrites the address data on the zoom code of the RAM 30b to address data corresponding to the zoom code (step S211).

Thereafter, the state of the test mode bit is checked at step S213. If the test mode bit is "1," control skips steps S215 and S217 and goes to step S219. If the test mode bit is "0," which means a normal mode, the zoom code is inputted from the zoom code plate 37, since the stored data of the internal RAM 30b is not rewritten to the address data by the zoom code. Consequently, the address data of the RAM 30b is rewritten to the address data based on the zoom code, and then, control proceeds to step S219.

At step S219, based on the data stored at the address of the ROM 30a corresponding to the address data of the focal length written in the RAM 30b, the lens data corresponding to the focal length is calculated. The lens data thus calculated is set at a predetermined address in the RAM 30b (step S221).

An acknowledgement signal is outputted to the camera body 1 to permit the interruption (steps S223 and S225). Thereafter, a NOP (no operation) process is performed at step S227. After that, control waits for the inputted of the command signals, etc.

The lens CPU 30 outputs the acknowledgement signal when all the data output command signals are inputted from the camera body 1 and then outputs the clock signal to terminal $\overline{SCK}$, so that all the data stored in the RAM 30b are synchronously outputted with the clock signal (steps S231, S233 and S235).

Upon completion of the outputted of the data, the acknowledgement signal is outputted, and the test mode bit is set to "0" (steps S237 and S239). Thereafter, control is returned.

Thus, the lens data corresponding to the focal lengths can be obtained from the zoom lens 2 without a zooming operation.

On the other hand, the camera body 1 demands the clock signal upon receipt of the acknowledgement signal outputted at step S223, at step S241. Consequently, when the clock signal is input from the lens CPU 30, the data outputted command is outputted (step S243). If the acknowledgement signal is received from the lens CPU 30 at step S245, the lens data is inputted from the lens CPU 30 (step S247). Upon receipt of the acknowledgement signal of the lens data, control is returned at step S249.

The lens data outputted from the lens CPU 30 is received by the camera body 1 and sent to an external device, such as an office computer or a personal computer. The computer performs the checking operation of the input data.

If other data, or the data corresponding to, all, of the focal lengths are read, the zoom codes outputted at step S205 are replaced every time the output of the lens data is finished at the test mode.

As can be seen from the foregoing, according to the present invention, since the address data of ROM 30b can be rewritten in accordance with the zoom code outputted from the camera body 1 to read the lens data which is varied by the zooming without effecting the mechanical zooming operation, whether the data corresponding to the focal length is stored in the ROM 30b can be easily checked.

Although the above discussion has been directed to the testing of the lens data which varies depending on the focal length, the present invention can be applied to the testing of the lens data which varies depending on the object distance. In this alternative, the data on the focal length is replaced with data on the object distance.

Although the lens data varying in accordance with the focal length or the object distance is obtained by calculation in the illustrated embodiments, it is possible to provide a modified arrangement in which all lens data, including the variable lens data corresponding to the focal lengths or the object distances are prestored in the ROM, so that the address at which the lens data corresponding to the desired focal length or object distance is stored is designated by the data of the RAM.

As can be understood from the above discussion, in a photographing lens having a plurality of lens data corresponding to the focal lengths or object distances varying in accordance with the zooming or the focus adjustment, according to the present invention, the lens data corresponding to the specific focal length Or object distance can be easily obtained from the photographing lens without effecting the zooming or the focus adjustment, thus resulting in an easy inspection of the photographing lens during, or after the manufacturing thereof.

We claim:

1. A photographing system including a camera body, a photographing lens which is detachably attached to the camera body and a testing device, said photographing lens including memory means that stores lens data corresponding to a plurality of photographing conditions, input and output means for transmitting and receiving data to and from either said testing device or said camera body, photographing condition varying means for varying said plurality of photographing conditions of said photographing lens, and data reading means for reading said lens data corresponding to photographing condition data varied by said photographing condition varying means, comprising:

means for outputting information of dummy photographing conditions without operating said photographing condition varying means; and, means for evaluating outputted information of dummy photographing conditions, wherein said data reading means comprising means for reading said lens data corresponding to the information of said dummy photographing condition inputted to said input and output means, said data reading means further comprising means for outputting said read lens data through said input and output means.

2. A photographing lens according to claim 1, wherein said photographing lens comprises a zoom lens.

3. A photographing lens according to claim 2, wherein said plurality of photographing conditions includes focal length data.

4. A photographing lens according to claim 3, wherein said photographing condition detecting means comprises a function to detect a present focal length of said zoom lens.

5. A photographing lens according to claim 4, wherein said photographing condition detecting means comprises a zoom code plate to detect said present focal length of the said zoom lens.

6. A photographing lens according to claim 5, wherein said focal length is divided into a plurality of focal length areas, so that lens data corresponding to each of said focal length areas is stored in said memory means.

7. A photographing lens according to claim 2, wherein said photographing lens can be detachably attached to a body of a single lens reflex camera.

8. A photographing lens according to 1, wherein said plurality of photographing conditions include object distance data.

9. A photographing lens according to claim 8, wherein said photographing condition detecting means comprises a function to detect a present object distance of said photographing lens.

10. A photographing lens according to claim 9, wherein said data reading means reads lens data corresponding to said object distance data inputted through said input and output means from said memory means to output said read data through said input and output means.

11. A photographing lens according to claim 9, wherein said photographing condition detecting means comprises a distance code plate for detecting said present object distance.

12. A photographing lens according to claim 11, wherein said object distance data is divided into a plurality of object distance areas, so that said lens data corresponding to each of said object distance areas is stored in said memory means.

13. A photographing lens according to claim 8, wherein said photographing lens can be detachably attached to a body of a single lens reflex camera.

14. The photographing system according to claim 1, comprising means for displaying and printing lens data read by said data reading means via said input and output means.

15. The photographing system according to claim 1, said testing device comprising means external to said camera body.

16. The photographing system according to claim 1, said external testing device comprising a computer.

* * * * *

UNITED STATES PATENT AND TRADEMARK OFFICE
CERTIFICATE OF CORRECTION

PATENT NO. : 5,274,416
DATED : December 28, 1993
INVENTOR(S) : Masahiro KAWASAKI et al.

It is certified that error appears in the above-indentified patent and that said Letters Patent is hereby corrected as shown below:

At column 21, line 8 (claim 5, line 4) of the printed patent, delete "the".

Signed and Sealed this

Twenty-ninth Day of August, 1995

Attest:

BRUCE LEHMAN

*Attesting Officer*    *Commissioner of Patents and Trademarks*